(12) United States Patent
Fu et al.

(10) Patent No.: US 9,110,559 B2
(45) Date of Patent: Aug. 18, 2015

(54) DESIGNING A GUI DEVELOPMENT TOOLKIT

(71) Applicant: International Business Machines Corporation, Armonk, NY (US)

(72) Inventors: Lin Fu, Shanghai (CN); Ka Lin, Shanghai (CN); Fang Lu, Shanghai (CN); Jia Lei Ma, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 13/850,423

(22) Filed: Mar. 26, 2013

(65) Prior Publication Data

US 2013/0263028 A1 Oct. 3, 2013

(30) Foreign Application Priority Data

Mar. 31, 2012 (CN) .......................... 2012 1 0092736

(51) Int. Cl.
*G06F 3/0481* (2013.01)
*G06F 9/44* (2006.01)

(52) U.S. Cl.
CPC ............... *G06F 3/0481* (2013.01); *G06F 8/38* (2013.01); *G06F 9/4443* (2013.01)

(58) Field of Classification Search
CPC ............ G06F 8/34; G06F 9/4443; G06F 8/38
USPC ........................................................ 715/763
See application file for complete search history.

(56) References Cited

U.S. PATENT DOCUMENTS

| | | | |
|---|---|---|---|
| 6,493,868 B1* | 12/2002 | DaSilva et al. | 717/105 |
| 7,895,522 B2 | 2/2011 | Wong et al. | |
| 8,522,209 B2* | 8/2013 | Wintergerst et al. | 717/124 |
| 8,561,015 B2* | 10/2013 | Rowan et al. | 717/105 |
| 8,683,445 B2* | 3/2014 | Abraham et al. | 717/125 |

(Continued)

FOREIGN PATENT DOCUMENTS

EP 2109297 A1 10/2009

OTHER PUBLICATIONS

Lamberti, F. et al., "Extensible GUIs for remote application control on mobile device," Computer Graphics and Applications, IEEE, vol. 28, No. 4, pp. 50-57, 2008.

(Continued)

*Primary Examiner* — David Phantana Angkool
(74) *Attorney, Agent, or Firm* — Cuenot, Forsythe & Kim, LLC (57) ABSTRACT

Designing a GUI development toolkit includes creating a windows event class with a property of window predefined condition events and a property of window drag and drop events; creating a windows adapter class with two trigger methods; creating a windows class with a window listener method configured to cause the window to enter into an edit mode in response to detecting the property of window predefined condition events is triggered; and to obtain and save initial location, dragged-to location and the mapping relationship between thereof for each component in the window in response to detecting that the property of window drag and drop events is triggered; and creating a component class with an action listener method defined to cause components in a window to be dragged to other locations of the window in which the components are located in response to detecting that the window is under the edit mode.

20 Claims, 4 Drawing Sheets

Constructor Summary

Button()
    Constructs a button with an empty string for its label.

Button(String label)
    Constructs a button with the specified label.

(56) References Cited

U.S. PATENT DOCUMENTS

| | | | |
|---|---|---|---|
| 8,812,964 B2* | 8/2014 | Lau et al. | 715/762 |
| 8,904,356 B2* | 12/2014 | Bates | 717/125 |
| 8,907,990 B2* | 12/2014 | Yanase | 345/667 |
| 8,966,447 B2* | 2/2015 | Hoke et al. | 717/124 |
| 8,997,045 B2* | 3/2015 | Balasubramanian et al. | 717/121 |
| 2003/0206195 A1 | 11/2003 | Matsa et al. | |
| 2008/0195961 A1 | 8/2008 | Bae et al. | |
| 2009/0265644 A1 | 10/2009 | Tweed et al. | |
| 2010/0275163 A1 | 10/2010 | Gillespie et al. | |
| 2013/0263028 A1* | 10/2013 | Fu et al. | 715/763 |

OTHER PUBLICATIONS

"A system and method to determine and display a list of time-based short-cut icons in mobile system,"[online] IP.com Prior Art Database, Disclosure No. IPCOM000208632D, Jul. 14, 2011 [retrieved Mar. 25, 2013] retrieved from the Internet: <http://ip.com/IPCOM/000208632>, 4 pgs.

* cited by examiner

Field Summary

| | |
|---|---|
| static int | WINDOW_ACTIVATED<br>The window-activated event type. |
| static int | WINDOW_CLOSED<br>The window closed event. |
| static int | WINDOW_CLOSING<br>The "window is closing" event. |
| static int | WINDOW_DEACTIVATED<br>The window-deactivated event type. |
| static int | WINDOW_DEICONIFIED<br>The window deiconified event type. |
| static int | WINDOW_FIRST<br>The first number in the range of ids used for window events. |
| static int | WINDOW_GAINED_FOCUS<br>The window-gained-focus event type. |
| static int | WINDOW_ICONIFIED<br>The window iconified event. |
| static int | WINDOW_LAST<br>The last number in the range of ids used for window events. |
| static int | WINDOW_LOST_FOCUS<br>The window-lost-focus event type. |
| static int | WINDOW_OPENED<br>The window opened event. |
| static int | WINDOW_STATE_CHANGED<br>The window-state-changed event type. |

Fig. 3

Method Summary

| | |
|---|---|
| void | windowActivated(WindowEvent e)<br>Invoked when the Window is set to be the active Window. |
| void | windowClosed(WindowEvent e)<br>Invoked when a window has been closed as the result of calling dispose on the window. |
| void | windowClosing(WindowEvent e)<br>Invoked when the user attempts to close the window from the window's system menu. |
| void | windowDeactivated(WindowEvent e)<br>Invoked when a Window is no longer the active Window. |
| void | windowDeiconified(WindowEvent e)<br>Invoked when a window is changed from a minimized to a normal state. |
| void | windowIconified(WindowEvent e)<br>Invoked when a window is changed from a normal to a minimized state. |
| void | windowOpened(WindowEvent e)<br>Invoked the first time a window is made visible. |

Fig. 4

```xml
<?xml version='1.0' encoding='UTF-8' standalone='yes'?>

<assembly xmlns='urn:schemas-microsoft-com:asm.v1' manifestVersion='1.0'>
<dependency>   ...   </dependency>

<window id="xxx">

<component id="xxx">

<originalLocation> ... ... </originalLocation>

<imagedLocation> ... ... </imagedLocation>

</component>

<component id="xxx"> ... ... </component>

<component id="xxx"> ... ... </component>

... ... (more components)

</window>

<window id="xxx">

... ...

</window>

... ...

(more windows)    ... ...

</assembly>
```

System 700 module for creating a windows event class 701 module configured to create a windows adapter class 702 module configured to create a windows class 703 module configured to create a component class 704

Fig. 7

DESIGNING A GUI DEVELOPMENT TOOLKIT

CROSS-REFERENCE TO RELATED APPLICATIONS

This application claims the benefit of China Application Number 201210092736.7 filed on Mar. 31, 2012, which is fully incorporated herein by reference.

BACKGROUND

The present invention relates to a GUI development toolkit, and more specifically, to methods and systems for designing a GUI development toolkit.

GUI is the acronym of Graphical User Interface. The wide use of a GUI is one of important achievements of computer technology development. The use of a GUI greatly benefits non-professional users. Users can easily operate computers through windows, menus and keys. And especially the smart touch pad devices, being widely used nowadays, take the user experience of the GUI to the extreme. Users can operate their smart touch pad devices such as tablets, touch pad phones, e-books, MP4 players by touch and drag.

In this context, some users would have personalized needs. For example, some users often use the left hand to operate the equipment, while the initial locations of the GUI components in the application, such as input boxes, buttons, keyboard, etc. are not designed for left-handed users; or some users might want to rearrange the graphical user interface in accordance with their preferences in their own devices, and so on. Therefore, there is a need for the application's GUI components to be designed to be movable, allowing users to move any GUI widgets to the desired locations according to their needs, or to rearrange the entire interface. Existing technologies have supported such design, but in the existing technology schemes, each application has to be individually designed, that is, for each application, separate source code has to be written to support this function. If users want all the GUIs in all applications on a device to support such functionality, these applications must be rewritten, even in the program design stage, which involves an enormous amount of work.

BRIEF SUMMARY

A method for designing a graphical user interface (GUI) development tool includes creating a windows event class, in which a property of window predefined condition events and a property of window drag and drop events are defined; creating a windows adapter class, in which a trigger method of window predefined condition events is defined to trigger the property of window predefined condition events defined in the window event class in response to occurrence of the window predefined condition events; and a trigger method of window drag and drop event is defined to trigger, using a processor, the property of window drag and drop event defined in the windows event class under the edit mode in response to occurrence of the window drag and drop events. The method also includes creating, using the processor, a windows class, in which a window listener method is created which is configured to cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered. The method further includes creating a component class, in which an action listener method is defined to cause components in a window to be dragged to other locations of the window in which the components are located in response to detecting that the window is under the edit mode.

A system for designing a GUI development tool includes a processor programmed to initiate executable operations. The executable operations include creating a windows event class, in which a property of window predefined condition events and a property of window drag and drop events are defined; creating a windows adapter class, in which a trigger method of window predefined condition events is defined to trigger the property of window predefined condition events defined in the window event class in response to occurrence of the window predefined condition events; and a trigger method of window drag and drop event is defined to trigger the property of window drag and drop event defined in the windows event class under the edit mode in response to occurrence of the window drag and drop events. The executable operations also include creating a windows class, in which a window listener method is created which is configured to cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered. The executable operations further include creating a component class, in which an action listener method is defined to cause components in a window to be dragged to other locations of the window in which the components are located in response to detecting that the window is under the edit mode.

A computer program product for designing a GUI development tool includes a computer readable storage medium having program code stored thereon. The program code is executable by a processor to perform a method. The method includes creating, using the processor, a windows event class, in which a property of window predefined condition events and a property of window drag and drop events are defined; creating, using the processor, a windows adapter class, in which a trigger method of window predefined condition events is defined to trigger the property of window predefined condition events defined in the window event class in response to occurrence of the window predefined condition events; and a trigger method of window drag and drop event is defined to trigger, using the processor, the property of window drag and drop event defined in the windows event class under the edit mode in response to occurrence of the window drag and drop events. The method also includes creating, using the processor, a windows class, in which a window listener method is created which is configured to cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered. The method further includes creating, using the processor, a component class, in which an action listener method is defined to cause components in a window to be dragged to other locations of the window in which the components are located in response to detecting that the window is under the edit mode.

BRIEF DESCRIPTION OF THE SEVERAL VIEWS OF THE DRAWINGS

Through the more detailed description of some embodiments of the present disclosure in combination with the accompanying drawings, the above and other objects, features and advantages of the present disclosure will become more apparent, wherein the same reference numbers generally refer to the same components in the embodiments of the present disclosure.

FIG. 3 shows the event properties defined in the Java AWT java.awt.event.WindowEvent class;

FIG. 4 shows the defined event trigger methods in WindowListener interface in Java AWT;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
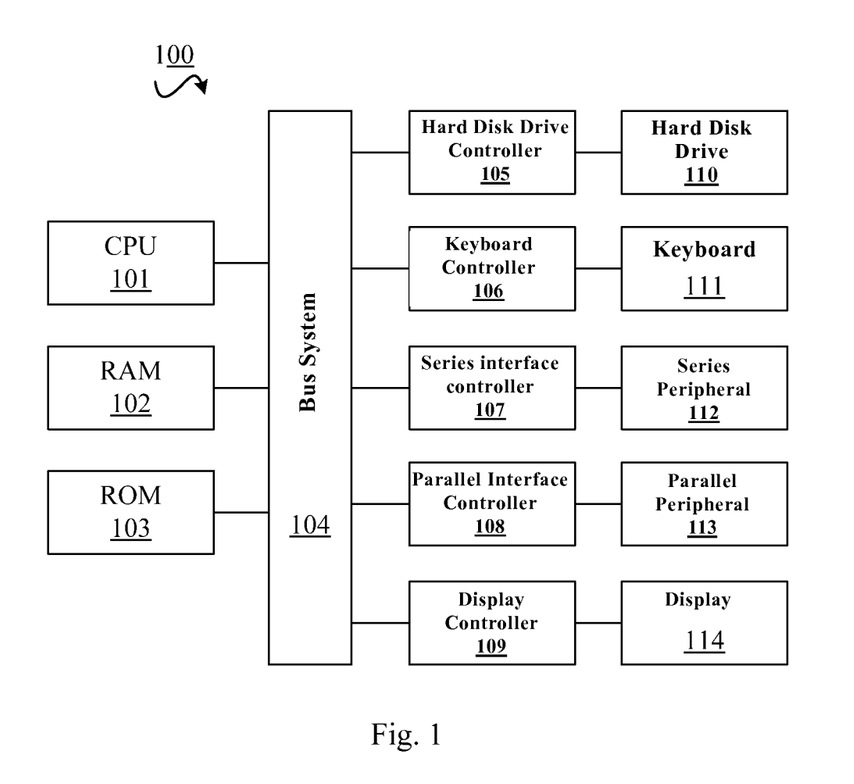
FIG. 1 shows an exemplary computer system which is applicable to implement the embodiments of the present invention.

FIG. 1 shows an exemplary computer system 100 which is applicable to implement the embodiments of the present invention. As shown in FIG. 1, the computer system 100 may include: CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for exemplary purposes rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Through creation of a new programming language or modifications and additions to related classes, interfaces, property, event listener methods in a GUI development toolkit in existing programming language, embodiments of the present invention make the widgets in the GUI of any applications developed by the programming language movable by the user.

According to one embodiment of the present invention, there is provided a method for designing a GUI development tool, comprising: creating a windows event class, in which a property of window predefined condition events and a property of window drag and drop events are defined; creating a windows adapter class, in which a trigger method of window predefined condition events is defined to trigger the property of window predefined condition events defined in the window event class in response to occurrence of the window predefined condition events; and a trigger method of window drag and drop event is defined to trigger the property of window drag and drop event defined in the windows event class under the edit mode in response to occurrence of the window drag and drop events; creating a windows class, in which a window listener method is created which is configured to cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered; and creating a component class, in which an action listener method is defined to cause components in a window to be dragged to other locations of the window in which the components are located in response to detecting that the window is under the edit mode.

According to another embodiment of the present invention, there is provided a system for designing a GUI development Tool, comprising a module configured to create a windows event class, comprising a module configured to define a property of window predefined condition events and a property of window drag and drop events; a module configured to create a windows adapter class, comprising a module configured to define a trigger method of window predefined condition events to trigger the property of window predefined condition events defined in the window event class in response to occurrence of the window predefined condition events; and a module configured to define a trigger method of window drag and drop event to trigger the property of window drag and drop event defined in the windows event class under the edit mode in response to occurrence of the window drag and drop events; a module configured to create a windows class, comprising a module configured to create a window listener method which is configured to cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered; and a module configured to create a component class, comprising a module configured to define an action listener method to cause components in a window to be dragged to other locations of the window in which the components are located in response to detecting that the window is under the edit mode.

There are a variety of GUI development toolkits, and different GUI development toolkits are used in different programming languages. And even for one programming language, there are many GUI development toolkits. For example, the GUI development toolkits for the Java language include AWT, Swing, etc.; and the GUI development toolkits for C++ language include CroPL MacAPP on the Apple platform, Linux platform GTK+, etc. Developing applications using existing GUI development toolkits, once developed, the location of the window components (Widget) is fixed, and users cannot change the layout of these components during the run time. In existing technologies, although some applications support that the various GUI components location can be set by the user, it is just because the source code was added into the program to support this feature. If users want all applications in an operating system to support this feature, they have to redesign all the applications, which is a tremendous amount of work.

In this specification, it is considered to improve GUI development toolkits so that applications using the GUI development toolkits only need be recompiled in an improved environment to support this feature, which would also greatly save the cost of application development. In this specification, Java AWT is taken as an example to describe the concrete realization of the invention. GUI development toolkits for other programming languages can be improved similarly to achieve the same functionality.

In the present invention, the basic elements of the GUI development toolkit are called components, including one or more Buttons, Lists, MenuBars, Checkboxs, TextFields, and so on.

When the GUI toolkit is designed to be able to customize the component locations, the following three aspects should be considered:

1. The window can be activated into an edit mode. Under the edit mode, each component in the window can be dragged and dropped to a new location. The original location, the dragged-to location, and corresponding relationship of the locations of each component are recorded.

2. After the application is restarted, each component can be displayed in the dragged-to location.

Each component in the dragged-to location can receive user actions during the runtime of the program.

Figure 2:
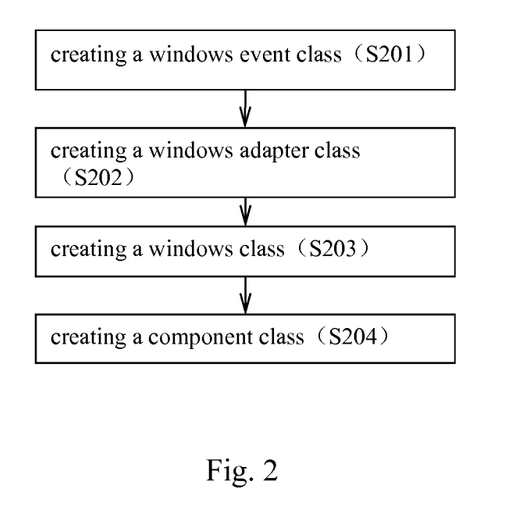
FIG. 2 shows a method process for designing the GUI development toolkits.

Based on the above ideas, a method for designing a GUI development toolkit is disclosed in this specification with consideration of the structure of such modules as window class, window event class, windows adapter class, and each component class, etc. in the GUI development toolkit. FIG. 2 shows the design process for such a GUI development tool, the process comprises the following steps.

At step S201, a window event class is created, in which a property of window predefined condition events and a property of window drag and drop events are created. At step S202, a window adapter class is created, in which a trigger method of window predefined condition events is defined to trigger the property of window predefined condition events defined in the window event class in response to the occurrence of the window predefined condition events; and a trigger method of window drag and drop event is defined to trigger the property of window drag and drop events defined in the window event class under the edit mode, in response to occurrence of the window drag and drop events. At step S203, a window class is created, in which a window listener method is created which is configured to cause the window to enter into an edit mode in response to detecting that the property of window predefined condition events defined in the window event class is triggered; and to obtain and save the initial location, the dragged-to location, and the mapping relationship between thereof for each component in the window in response to detecting that the property of window drag and drop events that is defined in the window class is triggered. At step S204, a component class is created, in which an action listener method is defined to cause components in a window to be dragged to other locations of the window in which the components are located in response to detecting that the window is under edit mode.

The above window event class, window class, window adapter class, as well as component class can be re-created in the GUI development toolkit, or can be derived by inheriting the original window event class, window listener interface, window class, window adapter class, and component class with addition of new properties and methods, or can be derived by directly modifying the above classes or interface in the original development toolkit. Therefore, the "creation" here has a broader meaning.

In some GUI development toolkits, the window adapter class is defined as window listener class. In this invention, they are interchangeable. Some GUI development toolkits also declare a window adapter interface or a window listener interface. These occurrences and the like are regarded as the same in this invention. In creation of the window event class and window adapter class, in general, the properties of window predefined condition events and drag and drop events are defined in the window event class. The two properties are initialized to a value such as 0, and their trigger methods are defined in the window adapter class. Once an event occurs, it is detected by the trigger method, and the property values are modified to, for instance, 1. In other words, the event is triggered. At the same time, the window listener method defined in the window class listens and captures the trigger of the property of window predefined condition events, which means that a predefined event occurs and the window will enter the edit mode where components can be dragged and dropped. When any component in the window is dragged and dropped, the action listener method of that component class is triggered and the values of the window drag and drop property is modified to, for instance, 1. At the same time, the window listener method defined in the window class detects that the window drag and drop event is triggered. The initial location, the dragged-to location, and location mapping information of that component are obtained and saved. The initial value and trigger modified value of the above properties are indicative. Those skilled in the art understand that those properties can be set to any valid values.

Based on the existing technologies, the creation of the component class can be implemented in many ways. In an implementation, a constructor method of the component class is defined to, in response to obtaining the initial location, the dragged-to location and location mapping information between thereof, construct and display it in the dragged-to location.

In this way, user actions, such as mouse click, double-click, approaching and leaving, are received by the component in the dragged-to location. In another embodiment, a constructor method of the component class is defined to construct the component in the initial location and, in response to obtaining the initial location, dragged-to location of the window component, and location mapping between thereof, display it in the dragged-to location.

Since the actually displayed location of that component is different from the location when it is constructed, an action listener method of the component class needs to be created. This action listener method is configured to, in response to an action event of the window component is listened in its dragged-to location, such as mouse click, double-click, approaching and leaving, performed on the actual displayed location of that component, transfer the action event to the component that is constructed in its initial location based on the saved initial location, dragged-to location, and location mapping information of that component. And the constructed component in the initial location receives the action event and makes response.

In the above implementation, the action listener method of the component class is in effect as soon as the class is re-constructed during the program runtime. Typical re-constructed time of the component class is after the program is restarted. In a further implementation, the action listener method is configured to, in response to detecting that the component has entered the edit mode, disable the function of listening to the action event of the component.

The above predefined condition events can be any particular user actions received in the window. For example:
Press any location and hold on for a certain period of time; press a particular location and leave a specific track on the window;
Design a fourth button, next to the maximize button, the minimize button, and the close button on the upper right corner of the window, to trigger the generation of the event; or design a dedicated button in other location of the window to trigger the generation of the event;
Design an additional menu item on the menu bar, toolbar, etc., to trigger the generation of event.

Using different pre-defined conditions, the event type can be adjusted so that the corresponding trigger method can be defined in the window listener interface.

The following example demonstrates how the above method may be implemented using Java AWT, whose component is located in the java.awt.Component package. Suppose the predefined condition event is to press anywhere on the window and hold on for more than 3 seconds. Those skilled in the art may appreciate that developers can use GUI development tools to either create a new WindowEvent class, WindowListener interface, WindowAdapter class, Window class, and Component class, or modify existing GUI development toolkit. Therefore, the concept of creation in this method has a generalized meaning Since to create a new class can be considered as to modify an existing class, the following description will demonstrate how to implement this method using modify mode.

Firstly, WindowEvent class is modified: java.awt.event.Window-Event class in Java AWT is modified. FIG. 3 shows the event properties defined in the java.awt.event.WindowEvent class in Java AWT.

Two new event properties are defined in WindowEvent class as shown in FIG. 3:
   public static final int WINDOW_HOLD_ON //The event property is defined as to trigger when the user presses anywhere on the window and holds on for more than 3 seconds.
   public static final int WINDOW_COMPONENT_DnD //The event property is defined as to trigger when the user drags and drops any component in the window.

Those two event trigger methods can be defined in the java.awt.event.Window-Adapter. Preferably, they can also be declared in the WindowListener interface. The interface logic is described here, and those skilled in the art can understand that modification for the logic of the trigger method is similar to the logic of trigger event of WindowAdapter classes. FIG. 4 shows the defined event methods in WindowListener interface in Java AWT.

As shown in FIG. 4, two new methods are declared in the WindowListener interface:
   void windowHeldon(WindowEvent e) //Trigger method of window predefined condition event The method is configured to trigger the property of window predefined condition events that is defined in the WindowEvent class when a user presses anywhere on the window and holds on for more than 3 seconds. Namely, the property of the window predefined condition events is modified when occurrence of a predefined event is detected;
   void windowDnDMaped (WindowEvent e) //Trigger method of window drag and drop event The method is configured to trigger the property of window drag and drop event defined in the WindowEvent class in response to a user dragging and dropping any component in the window. Namely, the property of the window drag and drop event is modified when a window drag and drop event is detected.

Then, the existing listener method addWindowListener in the Window class is modified. The prototype of the existing listener method is as follows:
   public void addWindowListener (WindowListener 1)
   Existing logic: WindowListener object in input and the specific event of the window is received.
   Added logic: When a WINDOW_HOLD_ON event is captured, window is caused into edit mode. When a WINDOW_COMPONENT_DnD event is captured, the information of the component's initial location, dragged-to location, and the location mapping information will be gathered and stored. If no WINDOW_COMPONENT_DnD event is captured, no processing will be performed.

Figure 5:
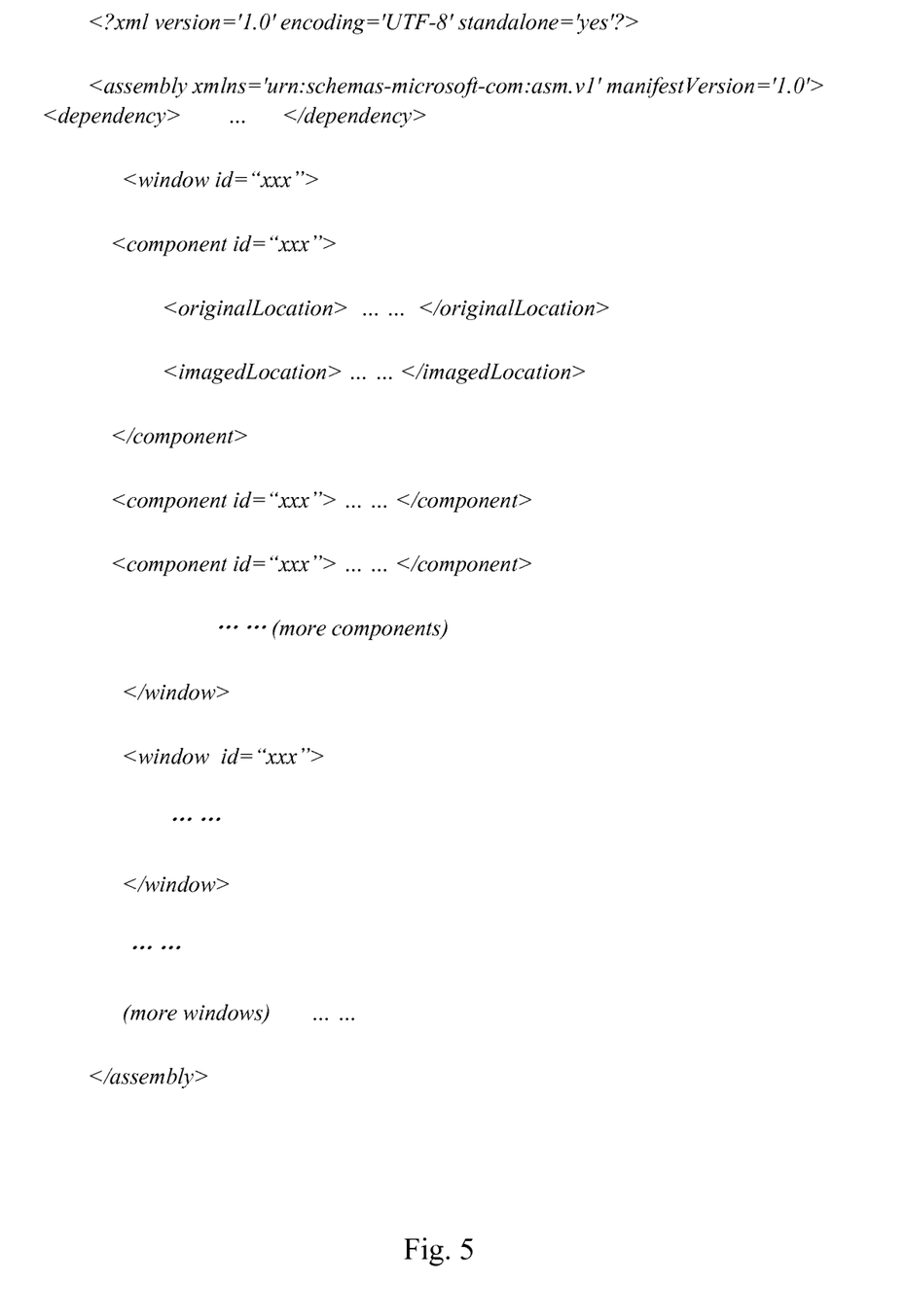
FIG. 5 shows an example of a Manifest file stored in XML format.

Preferably, the information of the component's initial location, the dragged-to location, and the location mapping information can be stored on a nonvolatile storage medium, such as hard disk, CD-ROM, or EEPROM. By doing so, users only need to move a component to their favorite location once, and the location relationship mapping can be loaded automatically for later usage without having to move the component again. The mapping information can be stored in different formats, such as text, database tables, XML files. FIG. 5 shows, as an example, a Manifest file in XML format. Each application has a corresponding Manifest file, named <app_name>.manifest, and each window of the application has one domain created for storing the information of all the component's location mapping relationship in that window.

There are many kinds of components. Below the button component is taken as an example to demonstrate how to modify Java AWT in the following section. In case of the button component, java.awt.Button class needs to be modified.

Figure 6:
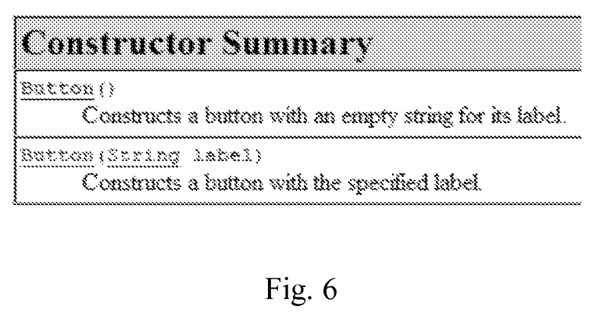
FIG. 6 shows a pre-defined constructor method in the java.awt.Button class in the Java AWT.

FIG. 6 shows the constructor methods of java.awt.Button in Java AWT. Taking the second constructor method for example:
   public Button(String label) throws HeadlessException //"lable" is the button's label string, which can be empty.
A new logic can be added to the existing constructor method of button class, or two new constructor methods can be created for button class.

Existing logic: buttons without label or with labels are constructed.

In one embodiment, the following new logic can be added to the existing constructor method: display a window component in its dragged-to location in response to obtaining the <app_name>.manifest file comprising the initial location, the dragged-to location of the window component, and the location mapping between thereof.

In a second embodiment, a new constructor method is created which, in response to obtaining the stored information of the button's initial location, the location after dragging, and the mapping relationship between these two locations in the window, displays this button in the location after dragging.

In a third embodiment, a new constructor method is created in the following way: construct the button at the initial location and, in response to obtaining the stored <app_name>.manifest file that manifests the button's initial location, the location after dragging, and the mapping relationship between these two locations in the window, displays this button in the location after dragging.

The constructor method for the second and third embodiment can be as follows:
   public Button(String label, Boolean loadProfile) throws HeadlessException //a new parameter loadProfile is added to indicate whether the <app_name>.manifest comprising the initial location, the dragged-to location of the window component, and the location mapping between thereof has been loaded.

In the first and third embodiments, the addActionListener method should also be created for the button class, which is defined as follows:
   public void addActionListener(ActionListener 1)//
   Existing logic: ActionListener object is input, a specific event received from the button for specific actions is listened, and the event will occur when the user presses or releases the mouse.

The added logic for the existing listener method includes: in response to an action event being captured on the dragged-to location of the button, transferring the action event to the button that is constructed in the initial location based on the stored initial location, dragged-to location, and location mapping information. Preferably, the action listener method of the button is configured to, in response to the component entering the edit mode, disable the function of listening to the action event of that component.

The modification for the other components is similar to the modification for the above button class, thus is omitted here.

Figure 7:
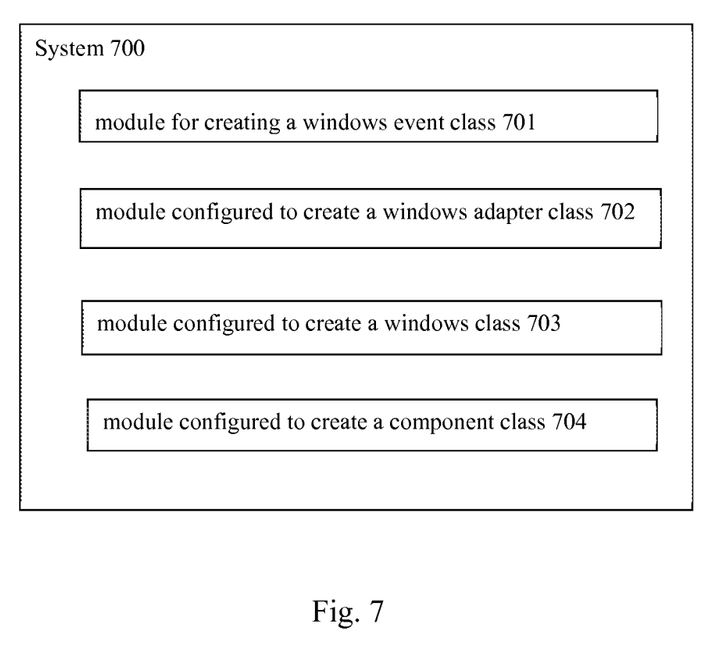
FIG. 7 shows a block diagram of a system for designing the GUI development toolkits.

Under the same inventive idea, this invention also discloses a system for designing a GUI development toolkit. FIG. 7 shows the block diagram of a system 700 for designing the GUI development toolkits. According to FIG. 7, the system 700 comprises: a module 701 configured to create a windows event class comprising a module configured to define property of window predefined condition event and a property of window drag and drop event; a module 702 configured to create a windows adapter class comprising: a module configured to define a module configured to define a trigger method of window predefined condition events to trigger the property of window predefined condition events defined in the window event class in response to occurrence of the window predefined condition events; and a module configured to define a trigger method of window drag and drop event to trigger the property of window drag and drop event defined in the windows event class under the edit mode in response to occurrence of the window drag and drop events; a module 703 configured to create a window class comprising: a module configured to create a window listener method which cause the window to enter into an edit mode in response to detecting the property of window predefined condition events defined in the windows event class is triggered; and to obtain and save initial location, dragged-to location and the mapping relationship between thereof for each component in the window in response to detecting that the property of window drag and drop events that is defined in the window class is triggered; and a module 704 configured to create a component class comprising a module configured to define an action listener method to cause components in a window to be dragged to other locations of the window in which the components are located in response to detecting that the window is under the edit mode.

In one embodiment, the module configured to create a component class comprises: a module configured to, in response to obtaining the initial location, the dragged-to location of the window component, and the location mapping between thereof, construct and display a window component in its dragged-to location.

In another embodiment, the module configured to create a component class comprises: a module configured to define a constructor method of the component class which constructs a window component in the initial location, and in response to obtaining the saved initial location, the dragged-to location of the window component, and the location mapping between thereof, and display the window component in its dragged-to location. Preferably, the module configured to create a component class comprises: a module configured to define an action listener method of the component class which, in response to an action event of the window component is listened in its dragged-to location, transfer an action event to the window component constructed in its initial location based on the saved initial location, dragged-to location of the window component, and location mapping between thereof. The runtime of the action listener method can be before the component class is re-constructed and during the program runs.

In one embodiment, the module configured to create action listener method is also configured to, in response to detecting that the component has entered the edit mode, disable the function of listening to the action event of the component.

In the above system, the predefined condition comprises a particular user actions received in the window, the components comprises all GUI components, such as button, Drop-down box, menu bar, select boxes, text fields, etc. The initial location, the dragged-to location of the window component, and the location mapping between thereof are stored in a non-volatile storage media.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for designing a graphical user interface (GUI) development tool, comprising:
creating a windows event class, in which a property of window predefined condition events and a property of window drag and drop events are defined;
creating a windows adapter class, in which a trigger method of window predefined condition events is defined to trigger the property of window predefined condition events defined in the window event class in response to occurrence of the window predefined condition events; and
a trigger method of window drag and drop event is defined to trigger, using a processor, the property of window drag and drop event defined in the windows event class under the edit mode in response to occurrence of the window drag and drop events;
creating, using the processor, a windows class, in which a window listener method is created which is configured to cause the window to enter into an edit mode in response to detecting the property of window predefined condition events defined in the windows event class is triggered; and
to obtain and save initial location, dragged-to location and the mapping relationship between thereof for each component in the window in response to detecting that the property of window drag and drop events that is defined in the window class is triggered; and
creating a component class, in which an action listener method is defined to cause components in a window to be dragged to other locations of the window in which the components are located in response to detecting that the window is under the edit mode.

2. The method according to claim 1, wherein in the component class, a constructor method is defined to, in response to obtaining the saved initial location, the dragged-to location of the window component, and the location mapping between thereof, construct and display a window component in its dragged-to location.

3. The method according to claim 1, wherein a constructor method of the component class is defined to construct a window component in the initial location, and in response to obtaining the saved initial location, the dragged-to location of the window component, and the location mapping between thereof, and display the window component in its dragged-to location.

4. The method according to claim 3, wherein an action listener method of the component class is configured to, in response to an action event of the window component is listened in its dragged-to location, transfer an action event to the window component constructed in its initial location based on the saved initial location, dragged-to location of the window component, and location mapping between thereof.

5. The method according to claim 1, wherein the action listener method is also configured to, in response to detecting that the component has entered the edit mode, disable the function of listening to the action event of the component.

6. The method according to claim 1, wherein the predefined condition comprises a particular user action received in the window.

7. The method according to claim 1, wherein the initial location, the dragged-to location of the window component, and the location mapping information between thereof are stored in a non-volatile storage media.

8. A system for designing a graphical user interface (GUI) development tool, comprising:
a processor programmed to initiate executable operations comprising:
creating a windows event class, in which a property of window predefined condition events and a property of window drag and drop events are defined;
creating a windows adapter class, in which a trigger method of window predefined condition events is defined to trigger the property of window predefined condition events defined in the window event class in response to occurrence of the window predefined condition events; and
a trigger method of window drag and drop event is defined to trigger the property of window drag and drop event defined in the windows event class under the edit mode in response to occurrence of the window drag and drop events;
creating a windows class, in which a window listener method is created which is configured to cause the window to enter into an edit mode in response to detecting the property of window predefined condition events defined in the windows event class is triggered; and
to obtain and save initial location, dragged-to location and the mapping relationship between thereof for each component in the window in response to detecting that the property of window drag and drop events that is defined in the window class is triggered; and
creating a component class, in which an action listener method is defined to cause components in a window to be dragged to other locations of the window in which the components are located in response to detecting that the window is under the edit mode.

9. The system according to claim 8, wherein in the component class, a constructor method is defined to, in response to obtaining the saved initial location, the dragged-to location of the window component, and the location mapping between thereof, construct and display a window component in its dragged-to location.

10. The system according to claim 8, wherein a constructor method of the component class is defined to construct a window component in the initial location, and in response to obtaining the saved initial location, the dragged-to location of the window component, and the location mapping between thereof, and display the window component in its dragged-to location.

11. The system according to claim 10, wherein an action listener method of the component class is configured to, in response to an action event of the window component is listened in its dragged-to location, transfer an action event to the window component constructed in its initial location based on the saved initial location, dragged-to location of the window component, and location mapping between thereof.

12. The system according to claim 8, wherein the action listener method is also configured to, in response to detecting that the component has entered the edit mode, disable the function of listening to the action event of the component.

13. The system according to claim 8, wherein the predefined condition comprises a particular user action received in the window.

14. The system according to claim 8, wherein the initial location, the dragged-to location of the window component, and the location mapping information between thereof are stored in a non-volatile storage media.

15. A computer program product for designing a graphical user interface (GUI) development tool, the computer program product comprising a computer readable storage device having program code stored thereon, the program code executable by a processor to perform a method comprising:
creating, using the processor, a windows event class, in which a property of window predefined condition events and a property of window drag and drop events are defined;
creating, using the processor, a windows adapter class, in which a trigger method of window predefined condition events is defined to trigger the property of window predefined condition events defined in the window event class in response to occurrence of the window predefined condition events; and
a trigger method of window drag and drop event is defined to trigger, using the processor, the property of window drag and drop event defined in the windows event class under the edit mode in response to occurrence of the window drag and drop events;
creating, using the processor, a windows class, in which a window listener method is created which is configured to cause the window to enter into an edit mode in response to detecting the property of window predefined condition events defined in the windows event class is triggered; and
to obtain and save initial location, dragged-to location and the mapping relationship between thereof for each component in the window in response to detecting that the property of window drag and drop events that is defined in the window class is triggered; and
creating, using the processor, a component class, in which an action listener method is defined to cause components in a window to be dragged to other locations of the window in which the components are located in response to detecting that the window is under the edit mode, wherein
the computer readable storage device is not a transitory, propagating signal per se.

16. The computer program product according to claim 15, wherein in the component class, a constructor method is defined to, in response to obtaining the saved initial location, the dragged-to location of the window component, and the location mapping between thereof, construct and display a window component in its dragged-to location.

17. The computer program product according to claim 15, wherein a constructor method of the component class is defined to construct a window component in the initial location, and in response to obtaining the saved initial location, the dragged-to location of the window component, and the location mapping between thereof, and display the window component in its dragged-to location.

18. The computer program product according to claim 17, wherein an action listener method of the component class is configured to, in response to an action event of the window component is listened in its dragged-to location, transfer an action event to the window component constructed in its initial location based on the saved initial location, dragged-to location of the window component, and location mapping between thereof.

19. The computer program product according to claim 15, wherein the action listener method is also configured to, in response to detecting that the component has entered the edit mode, disable the function of listening to the action event of the component.

20. The computer program product according to claim 15 wherein the action listener method is also configured to, in response to detecting that the component has entered the edit mode, disable the function of listening to the action event of the component.

* * * * *